April 7, 1959 J. H. ETTINGER 2,880,770
POWER OPERATED SCREW DRIVER
Filed April 18, 1957 4 Sheets-Sheet 1

INVENTOR.
JOHN H. ETTINGER.
BY
H. O. Clayton
ATTORNEY.

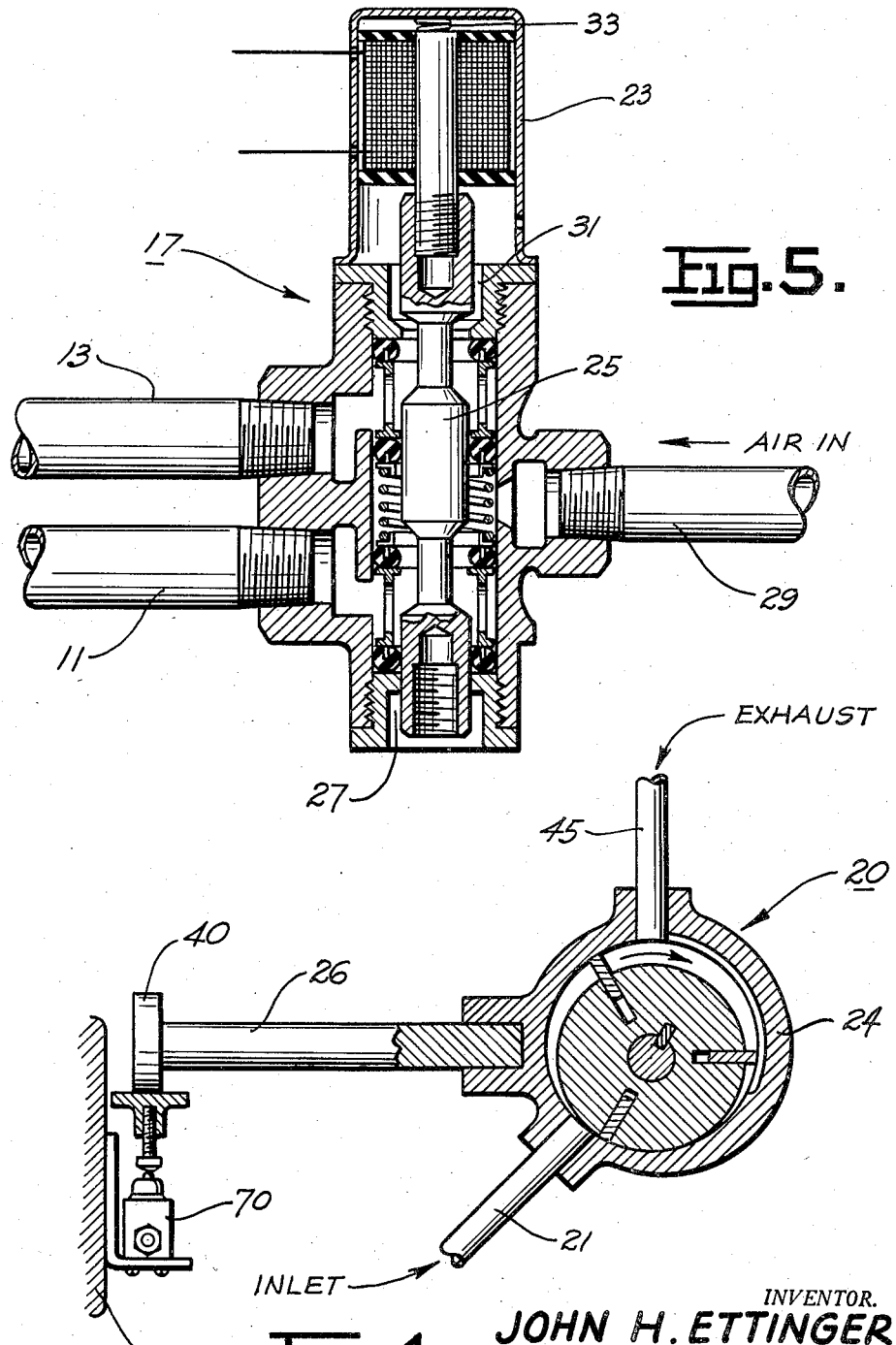

April 7, 1959　　　J. H. ETTINGER　　　2,880,770
POWER OPERATED SCREW DRIVER
Filed April 18, 1957　　　　　　　　　4 Sheets-Sheet 4

INVENTOR.
JOHN H. ETTINGER
BY
ATTORNEY.

United States Patent Office 2,880,770
Patented Apr. 7, 1959

2,880,770
POWER OPERATED SCREW DRIVER

John H. Ettinger, South Bend, Ind., assignor to Bendix Aviation Corporation, South Bend, Ind., a corporation of Delaware Application April 18, 1957, Serial No. 654,056

5 Claims. (Cl. 144—32)

This invention relates in general to a mechanism for securing together a plurality of parts of a work piece and in particular to a screw driver mechanism for correctly operating a screw in the operation of interconnecting two elements such as a brake cylinder and a brake backing plate of an automotive brake.

An important object of my invention is to provide a mechanism for quickly and effectively operating a fastening means in the operation of securing two elements together, the operation of said mechanism being automatically terminated when there has been a certain translatory movement of the fastening means and when the force required to operate said means reaches a certain value.

Yet another object of my invention is to provide a screw driver mechanism, the driving operation of which is automatically terminated when the screw being driven into place reaches a certain position and when the screw driving force exerted by the mechanism reaches a certain value.

My invention also contemplates the provision of a torque and distance responsive screw driving mechanism including means which is very quickly operative to terminate the driving operation of the mechanism immediately after the driving force exerted by the mechanism reaches a certain value provided however the screw being rotated into place has, at the time, reached a certain position.

Other objects of the invention and desirable details of construction of parts will become apparent from the following detailed description of certain illustrative embodiments of the invention, taken in conjunction with the accompanying drawings illustrating said embodiments, in which:

Figure 4 is a sectional view, taken on the line 4—4 of Figure 1, disclosing certain details of the control means of the mechanism of Figure 1;

Figure 5 is a sectional view disclosing details of the four-way valve of the control means of the mechanism of Figure 1;

Figures 1, 2:
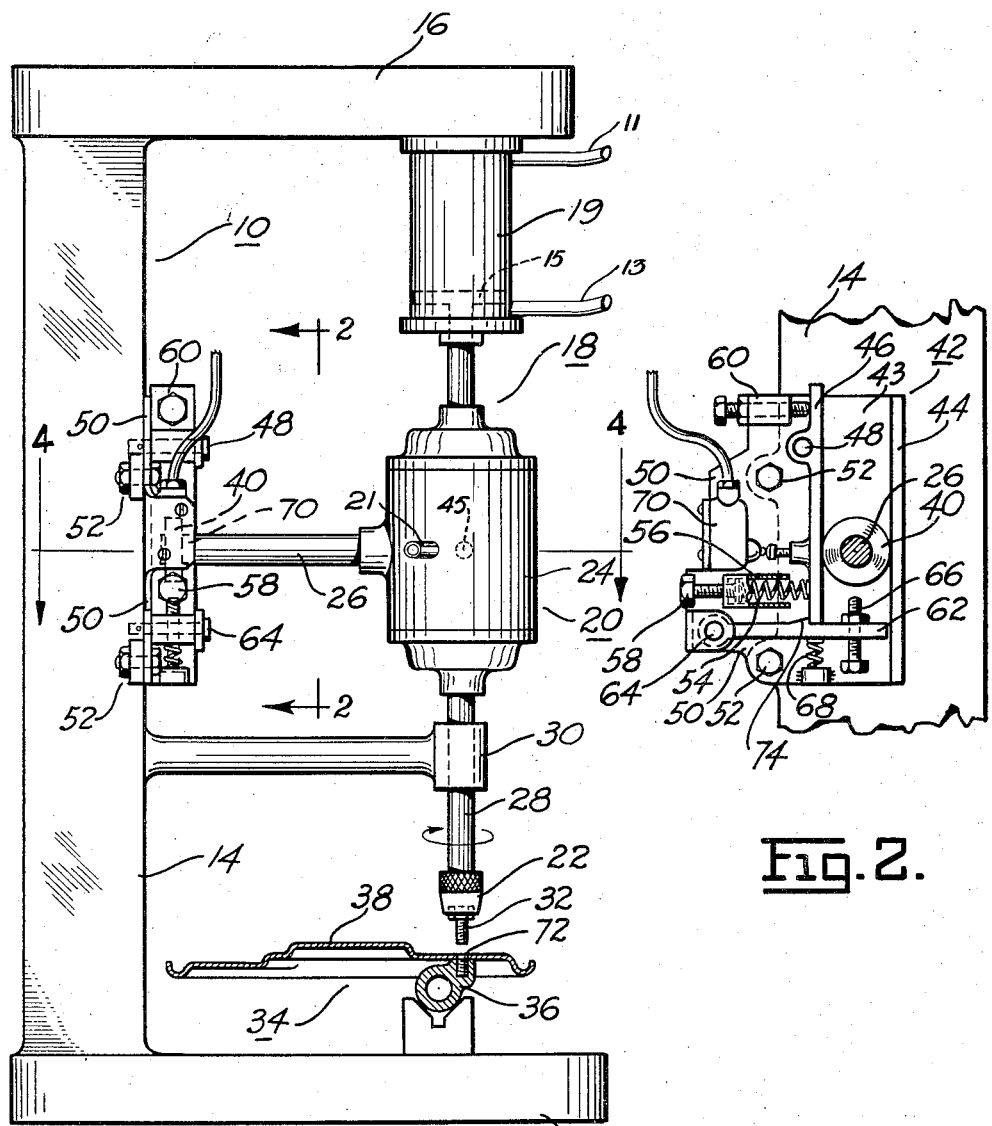
Figure 1 is a side elevational view of one embodiment of the screw driver mechanism constituting my invention.
Figure 2 is a view, looking in the direction of the arrows 2—2 in Figure 1, disclosing the prinicpal elements of the mechanism of said figure.

There is disclosed in Figure 2 of the drawings a preferred embodiment of my invention. The mechanism cooperating with the mechanism of Figure 2 includes a support 10 comprising a base 12, a vertically extending post 14, and a cross member 16, and a screw driving mechanism, generally indicated by the reference numeral 18, is mounted on the support 10. The embodiment of my invention disclosed in Figure 2 is disclosed in my (now abandoned) application Ser. No. 543,879, filed October 31, 1955, of which this case is a continuation-in-part.

Describing now the details of the screw driving mechanism 18, a double acting motor 19, preferably of the compressed air fluid pressure type and secured to the support member 16, serves to bodily move a driver motor 20, preferably of the air operated vane type, down and up to move a socket wrench 22 down and up in the operation of the mechanism. The driven motor mechanism includes a casing 24 and a torque arm 26 fixedly secured thereto; and the drive shaft 28 of this motor mechanism extends through a guide bearing 30 fixedly secured to the post 14. A capscrew 32 housed within the socket wrench 22 is, with the lowering of the motor 20 and rotation of the shaft 28, screw threaded into a work piece 34. In the illustrated embodiment of my invention, disclosed in Figure 1, this work piece includes a brake cylinder 36 and a brake backing plate 38, the cylinder being secured to the plate by the screw 32; however, my invention is obviously not limited to this particular work piece.

Describing now the principal features of my invention, it is desirable to quickly cut off the operation of the motors 19 and 20 when the operation of driving the screw into the work piece has been satisfactorily completed; and such completion is effected when the screw has reached a certain distance into the work and when the screw is tight enough in place. Now this last mentioned condition is measured by the reaction of the torque arm 26, said arm with a clockwise rotation of the shaft 28 being rotated in a counterclockwise direction, that is away from the plane of the drawing paper disclosing Figures 1 and 2. The direction of rotation of the shaft 28 is shown by the arrows in Figures 1 and 3.

Figures 1 to 4 inclusive of the drawings disclose the sensing mechanism for controlling the motors 19 and 20 to effect the aforementioned desired result. This control mechanism includes a roller 40 rotatably mounted on the end of the torque arm 26 and guided, during the downward movement of the motor and arm 26, by a channel 42 comprising a rectangular shaped plate portion 43, a rectangular shaped channel member 44 fixedly secured to the portion 43, and a rectangular shaped lever member 46. The latter member is pivotally mounted on a pin 48 mounted on an irregularly shaped support plate 50 secured to the post 14 by fastenings 52. The roller 40 is preferably fixed so as to fit within the channel 42, there being a minimum of play between the roller and side walls of the channel. A preloaded yieldable member 54, preferably a spring and contactable at one of its ends with the lever 46, is housed within a casing 56 secured to the plate 50; and the loading of this yieldable member is determined by a screw 58. An adjustable stop 60 mounted on the support plate 50 serves to maintain the lever 46 parallel or substantially parallel with the channel member 44 when the roller 40 is positioned above the pin 48, that is the fulcrum of said lever; otherwise, the preloaded member 54 would force the lever 46 out of its parallel relationship with the member 44 when the roller is so positioned.

As will be brought out in the description to follow, a latch member 62, pivotally mounted on a pin 64 mounted on a portion of the plate 50, serves to prevent a clockwise rotation of the lever 46 until after said latch member is rotated clockwise, Figure 2; and this operation is effected, during the downward movement of the arm 26, immediately after the roller 40 contacts an adjustable thrust member 66 secured to the latch. The latch is biased upwardly into contact with the end of the lever 46, Figure 2, by a spring 68. When the latch is rotated downwardly out of contact with the lever, said operation being effected by the movement of the roller into contact with the member 66, then the subsequent counterclockwise rotational movement of the arm 26 made possible by this release operation of the latch, results in a clockwise rotation of the lever to open a switch 70, and this operation results in a stopping of the motors 19 and 20 in their operation of rotating the screw 32 and bodily moving the motor 20 and parts connected thereto downwardly.

Figure 6:
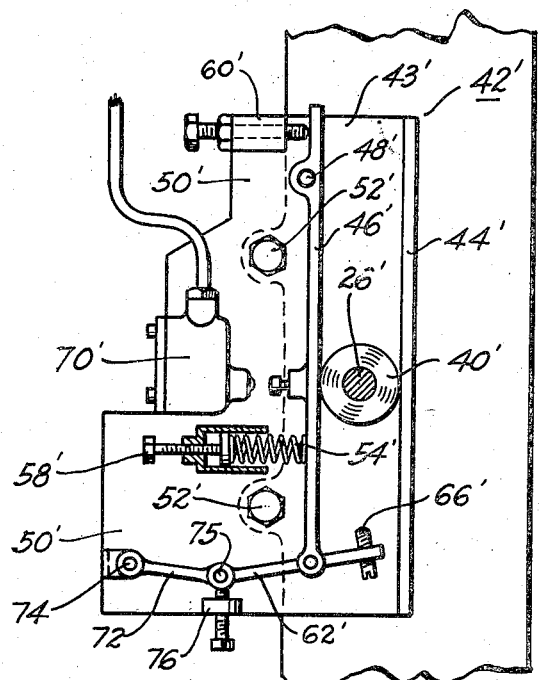
Figure 6 is a view, similar to Figure 2, disclosing another embodiment of the control means of my invention.
Figure 7:
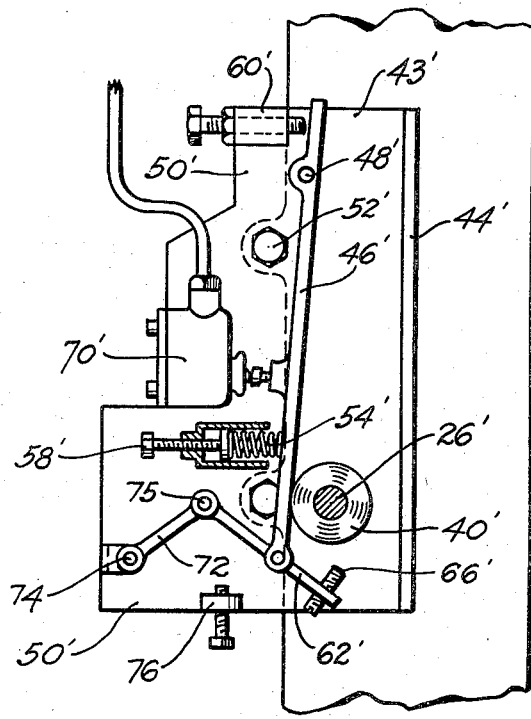
Figure 7 is a view disclosing the parts of the mechanism of Figure 6 in their position just as the switch being controlled is actuated.

There is disclosed in Figures 6 and 7 another embodiment of the sensing mechanism of my invention which is, in general, similar in operation to the sensing mechanism of Figures 1 and 2. Parts of the mechanism of Figures 6 and 7 which duplicate the functions of the mechanism of Figures 1 and 2 are given the same reference numerals plus the addition of a prime.

In the mechanism of Figures 6 and 7 a lever member 46' is pivotally connected to a latch member 62' which functions, together with a link 72, similarly to the crank or latch member 62 of Figure 2. This latch member 62' is pivotally connected to the link 72 which is pivotally mounted, at 74, to a support plate 50'. Acting together the members 62' and 72 constitute a toggle. In its switch off position disclosed in Figure 6 a knee portion 75 of the toggle 62', 72 contacts an adjustable stop 76 mounted on the support plate 50'; and in the operation of the mechanism a switch 70' is closed, Figure 7, when a roller 40' has moved downwardly far enough to contact a stop 66' to operate the toggle, Figure 7, and when said roller has exerted sufficient pressure on the member 46' to sufficiently compress a spring 54'. In other words, the switch 70' is closed when and only when the arm 26' with its roller 40' has moved downwardly a certain distance and said arm has exerted a certain load upon the spring 54'; both conditions must be fulfilled. In this operation the member 66' moves away from the member 40' immediately after the latter member contacts the member 66' long enough to move the knee 75 upwardly past its dead center position; all as disclosed in Figure 7.

In both embodiments of my invention a switch is operated when an actuating means, that is a roller mounted on the end of an arm, moves beyond a certain point in its stroke; and in this operation a stop member mounted on a crank member, that is the crank 62 of Figure 2 and the crank 62' of Figure 6, is contacted and said crank is rotated to make possible the operation of said switch.

Briefly describing the complete operation of the mechanism of my invention disclosed in Figure 2, a screw 32 is placed in the socket wrench 22 whereupon the motors 19 and 20 are energized; and this results in a rotation of the shaft 28 and a concurrent bodily movement of the motor 20 and arm 26 downwardly. The rotating screw then enters aligned threaded openings 72 in the work piece 34 to secure the two parts thereof together. The parts of the mechanism are so constructed and positioned that the threading of the screw 32 into the aligned openings 72 is just about completed when the roller 40 contacts the thrust member 66; and the next relatively small increment of movement of the roller results in a rotation of the latch to move a flange portion 74 thereof out of contact with the lever 46. The lever is now free to be rotated to open the switch 70 to cut off the operation of the motors 19 and 20; and this operation is effected when the force exerted by the arm 26 is sufficient to overcome the friction of the parts including the switch parts, and also overcome the loading of the spring 54. The parts of the mechanism of my invention are so constructed and arranged and the loading of the spring 54 is so set that the switch 70 is opened when the screw 32 has been threaded as desired.

Figure 3:
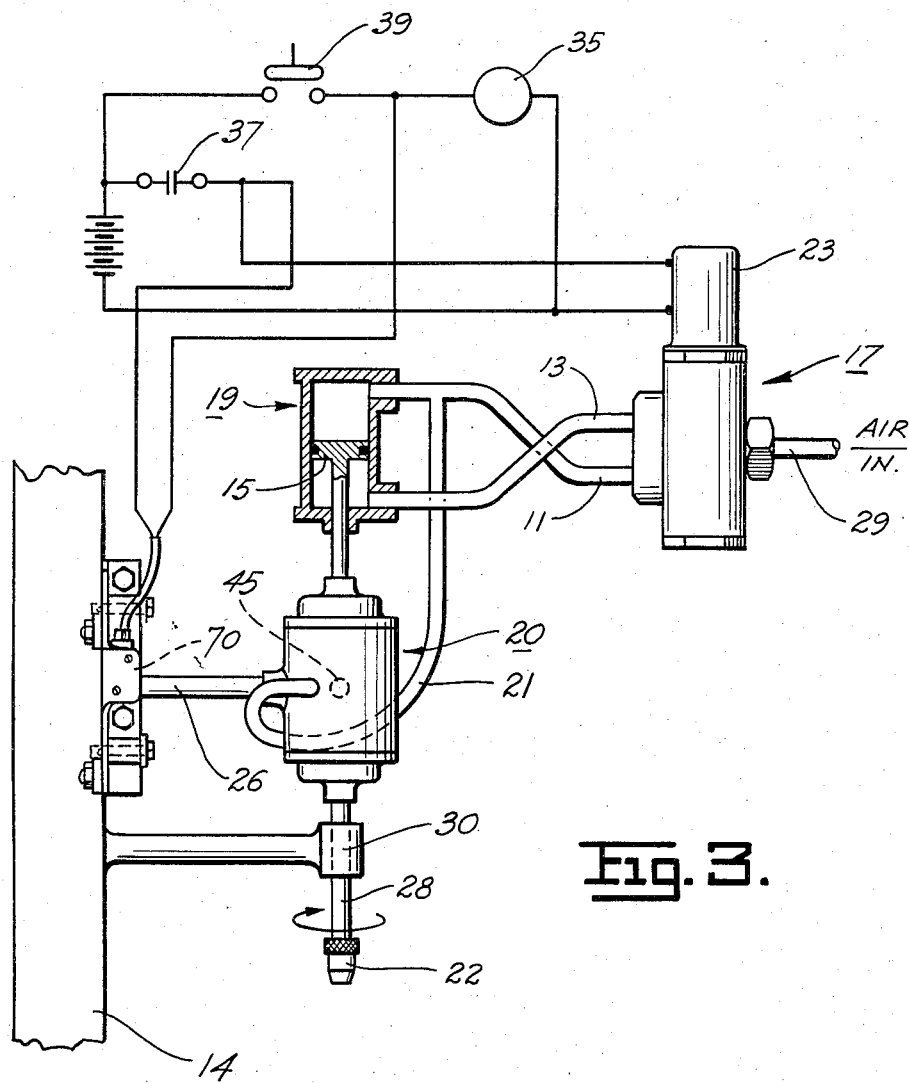
Figure 3 is a diagrammatic view of the parts of the control means of the mechanism of Figure 1.

The valvular means for controlling the fluid pressure motors 19 and 20 and the electrical means, including the aforementioned switch 70, for controlling said valvular means, constitutes no part of my invention; however, to make the disclosure of my preferred embodiment complete one well known control means is disclosed in Figures 3, 4 and 5 of this application. Referring therefore to Figure 3 diagrammatically disclosing the latter control, conduits 11 and 13, connected to the double ended motor 19 on opposite sides of its piston 15, are connected to opposite ends of a so-called four-way valve 17. A conduit 21, interconnecting the motor 20 and the conduit 11, serves to supply air under pressure to energize said motor when the valve 17 is operated to energize the motor 19 to bodily move the then energized motor 20 downwardly.

Describing the operation of the valve 17 disclosed in detail in Figure 4, this valve is operated in part by a solenoid 23 mounted on one end of the casing of the valve. As will be noted from an inspection of Figure 4 energization of the solenoid 23 serves to move a valve plunger 25 upwardly to close the air transmitting connection between a vent port 27 and the conduit 11, open the connection between the latter conduit and a conduit 29 leading to a suitable source of air pressure, not shown, and open the connection between a vent port 31 and the conduit 13; and this operation of the valve results in an energization of the motor 19 to bodily move the motor 20 downwardly and at the same time an energization of the motor 20 to effect a clockwise rotation of the screw operating drive shaft 28. As will be obvious from the above description and an inspection of Figure 4 of the drawings, when the solenoid 23 is de-energized a spring 33, compressed with an energization of the solenoid, expands to move the valve plunger 25 downwardly to reverse the connection to the motors 19 and 20 to vent the conduits 11 and 21 to the atmosphere and connect the conduit 13 to the source of air pressure; and this valve operation serves to energize the motor 19 to bodily return the motor 20 to its up position and substantially simultaneously therewith vent the vane type motor 20 to the atmosphere via a port 45 and thereby stop the drive shaft operation of said motor. The vanes and shaft driving rotor of the motor 20 are disclosed in some detail in Figure 4, however, such a van type motor is well known to those skilled in this art; accordingly it is not described in detail in this specification.

Describing the electrical means for controlling the operation of the solenoid 23, a relay, the coil 35 of which actuates a relay switch 37, is controlled by a manually operated push button type of switch 39; and as disclosed in Figure 3, the above described normally closed switch 70 serves as a so-called hold down switch in the circuitry; for when the coil 35 is energized by a closing of the switch 39 the relay switch 37 is closed and then when the attendant takes his finger off of the switch 39 the normally closed switch 70 takes over the control to keep the relay coil energized. Now as will be noted by an inspection of the circuitry of Figure 3 when the relay switch 37 is closed the solenoid 23 is energized to operate the valve 17 to effect the above described energization of the motors 19 and 20 to turn the screw 32; and when this screw operation is completed, as described above, the switch 70 is opened thereby de-energizing the solenoid 23 to initiate the return of the motor 19.

There is thus provided a relatively simple, effective, and easily serviced mechanism for securing together two parts of a work piece. The mechanism of my invention provides means for automatically cutting off the operation of the power means for operating the fastening means when and if the force necessary to rotate said fastening means has reached a certain value, and when and if the fastening means has been buried into the work piece a certain depth. In other words, with the mechanism of my invention the operation of securing the fastening means in place is automatically terminated when said means is secured tight enough and deep enough in the work piece.

While certain embodiments of the invention have been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

I claim:

1. A screw driver mechanism operative to effect a controlled translatory and rotary movement of a fastening member, said mechanism including power means adapted to bodily move the fastening means toward and into a work piece having a plurality of parts to be secured together, power operated driving means for rotating the fastening means as it enters aligned openings in the work piece to thereby secure together the aforementioned parts of said work piece, and means, including a switch, for controlling the operation of both of said power means to temporarily disable, that is cut off the operation of said two power means when the fastening means has, in its operation, been buried within the work piece a certain depth and also when the driving force exerted by the driving means has reached a certain value, said control means including a lever member, a latch associated with said lever member, and means, actuated by the driving motor, for actuating the latch and thereby making possible an operation of the lever member to effect an operation of the switch.

2. A screw driver mechanism operative to effect a controlled translatory and rotary movement of a fastening member, said mechanism including a support means for the elements of the mechanism, power means, including a fluid pressure motor, adapted to bodily move the fastening means toward and into a work piece having a plurality of parts to be secured together said power means being mounted on the support means, power operated driving means, including a fluid pressure motor, for rotating the fastening means as it enters aligned openings in the work piece to secure together the aforementioned parts of said work piece, said latter power means also being mounted on the support means; and means, including a switch, for controlling the operation of both of said power means to temporarily disable, that is, cut off the operation of said two power means when the fastening means has, in its operation, been buried within the work piece a certain depth and also when the driving force exerted by the driving means has reached a certain value, said control means including a lever member pivotally mounted on the support means, latch means also mounted on the support means and associated with the lever member, and a torque operated arm member actuated by the driving motor for actuating the latch means and thereby making possible an operation of the lever member to effect an operation of the switch.

3. A screw driver mechanism operative to effect a controlled translatory and rotary movement of a fastening member, said mechanism including a support means for the elements of the mechanism, power means, including a fluid pressure motor, adapted to bodily move the fastening means toward and into a work piece having a plurality of parts to be secured together, said power means being mounted on the support means, power operated driving means, including a fluid pressure motor, for rotating the fastening means as it enters aligned openings in the work piece to secure together the aforementioned parts of said work piece, said latter power means also being mounted on the support means; and a torque and depth sensitive means, including a switch, a lever for operating the switch, for controlling the operation of both of said power means to temporarily disable, that is, cut off the operation of said two power means when the fastening means has, in its operation, been buried within the work piece a certain depth and also when the driving force exerted by the driving means has reached a certain value, and means for controlling the operation of the lever including a spring loaded latch member pivotally mounted on the support means, and stop means mounted on the latch member said stop means being positioned to be contacted by torque operated means actuated by the driving motor.

4. A screw driver mechanism adapted to concurrently effect a translatory and rotary movement of a screw in the operation of securing said screw in place, said mechanism including a bodily and rotatably movable shaft, means mounted on the end of said shaft and adapted to house a screw, a driving motor connected to the shaft and adapted to rotate the same, another motor for bodily moving the driving motor and shaft connected thereto, and means for controlling the operation of said motors to automatically cut off the same when the shaft rotating force exerted by the driving motor reaches a certain value and the shaft has moved a certain distance in the operation of the mechanism, said control means including a bodily movable arm secured to the driving motor, motor control means actuated by an element mounted on the outer end of said arm, and means for controlling the mode of movement of the arm to determine the time of operation of the motor control means, said means comprising a lever member actuated by the arm and a toggle mechanism for controlling the operation of the lever member.

5. A screw driver mechanism adapted to concurrently effect a translatory and rotary movement of a screw in the operation of securing said screw in place, said mechanism including a bodily and rotatably movable shaft, means mounted on the end of said shaft and adapted to house a screw, a driving motor connected to the shaft and adapted to rotate the same, another motor for bodily moving the driving motor and shaft connected thereto; and means for controlling the operation of said motors to automatically cut off the same when the shaft rotating force exerted by the driving motor reaches a certain value and the shaft has moved a certain distance in the operation of the mechanism, said means including a bodily movable arm secured to the driving motor and operatively movable in two different planes; motor control means, including a switch, actuated by an element mounted on the outer end of said arm, means, comprising a switch operating lever member, for controlling the mode of movement of the arm to determine the time of operation of the motor control means, and means, comprising a toggle mechanism actuated by the arm, for controlling the operation of the lever member.

References Cited in the file of this patent
UNITED STATES PATENTS

| | | |
|---|---|---|
| 1,479,178 | Harvey | Jan. 1, 1924 |
| 1,648,944 | Hofstetter | Nov. 15, 1927 |
| 1,662,543 | Smith et al. | Mar. 13, 1928 |
| 2,627,770 | Hautau et al. | Feb. 10, 1953 |
| 2,705,030 | Koffler et al. | Mar. 29, 1955 |